L. DOTY.
Devices for Baling Hay.

No. 141,636.  Patented August 12, 1873.

Witnesses
Thos H Hutchins
H Lowe

Inventor
Levi Doty

UNITED STATES PATENT OFFICE.

LEVI DOTY, OF FRANKFORT, ILLINOIS.

IMPROVEMENT IN DEVICES FOR BALING HAY.

Specification forming part of Letters Patent No. 141,636, dated August 12, 1873; application filed June 25, 1873.

*To all whom it may concern:*

Be it known that I, LEVI DOTY, of Frankfort, in Will county and State of Illinois, have invented a certain Device for Baling Hay, of which the following is a specification:

My invention consists in the use of a device for holding the hoops on a bale of hay in such a manner that the ends of the hoops may be brought down to their proper place to be nailed.

Figure 1:
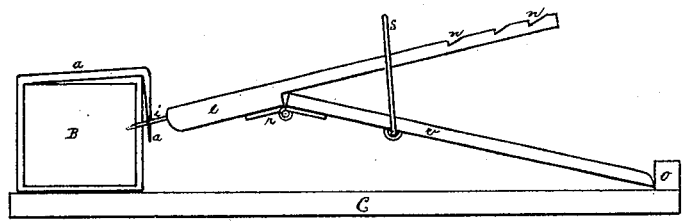
Figure 2:
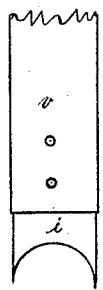

In the drawing hereto attached and making a part of this specification, Figure 1 represents a side elevation of a machine embodying my invention as it appears in operation, and Fig. 2 is a plan view on the top of the forked point $i$.

The construction of my device is more particularly shown in Fig. 1, and consists of the levers $e$ and $v$ hinged together at $r$. The lever $e$ has one end furnished with the forked point $i$, which, in operation, is placed astride of the hoop $a$, as shown.

The operation of the device is as follows: B is the bale, which has placed around it the hook $a$ in the ordinary manner, and may be fastened to the platform C, or may remain in the press while the operation is being performed, as is most convenient. The lever $e$ is placed against the side of the bale, as shown in Fig. 1, with the metal point $i$ astride of the end of the hoop $a$, while the opposite end of the other part of the lever $v$ is placed against a rest, $o$. It will be observed that by pressing down on the upper end of the lever $e$ the two levers will be brought together and held by means of the pawl $s$, which drops in the notches $n$ $n$, the effect of which is that the point of the hoop $a$ will be pried down and pressed up tight against the other part of the same hoop, so it can be nailed or otherwise properly fastened.

It will be noticed that the two points of the forked point $i$ enter into the side of the bale of hay, and that, in the operation as above described, has a tendency to pull down the end of the hoop $a$, so it will be tight around the bale, as well as to press it up against the hoop for nailing, as described. The forked point $i$ is constructed in that shape both for the purpose of having something to enter the bale as to prevent the end of the hoop from slipping sidewise off the remaining part of the same, which is usually the case where a beam or other common device is used.

Having thus described my invention, what I claim as new, and desire to secure by Letters Patent, is as follows:

The combination of the levers $e$ and $v$, pawl $s$, and forked point $i$, constructed, operating, and arranged, as and for the purpose set forth.

LEVI DOTY.

Witnesses:
   THOS. H. HUTCHINS,
   H. LOWE.